US011440826B2

(12) United States Patent
Medolago Albani et al.

(10) Patent No.: US 11,440,826 B2
(45) Date of Patent: Sep. 13, 2022

(54) PROCESS AND INSTALLATION FOR PURIFICATION OF WASHING WATERS OF CHEMICAL PLANTS

(71) Applicant: P.I.ECO S.R.L., Terno d'Isola (IT)

(72) Inventors: Pietro Medolago Albani, Terno d'Isola (IT); Giovanni Andrea Medolago Albani, Terno d'Isola (IT); Federico Alessandro Medolago Albani, Terno d'Isola (IT); Alessandro Medolago Albani, Terno d'Isola (IT)

(73) Assignee: P.I.ECO S.R.L., Terno d'Isola (IT)

( * ) Notice: Subject to any disclaimer, the term of this patent is extended or adjusted under 35 U.S.C. 154(b) by 175 days.

(21) Appl. No.: 17/052,581

(22) PCT Filed: Apr. 30, 2019

(86) PCT No.: PCT/IB2019/053534
§ 371 (c)(1),
(2) Date: Nov. 3, 2020

(87) PCT Pub. No.: WO2019/211747
PCT Pub. Date: Nov. 7, 2019

(65) Prior Publication Data
US 2021/0363042 A1    Nov. 25, 2021

(30) Foreign Application Priority Data

May 4, 2018    (IT) .................. 102018000005080

(51) Int. Cl.
| B01D 61/58 | (2006.01) |
| C02F 1/04 | (2006.01) |
| C02F 1/28 | (2006.01) |
| C02F 1/44 | (2006.01) |
| C02F 1/50 | (2006.01) |
| C02F 3/12 | (2006.01) |
| C02F 9/00 | (2006.01) |
| C02F 101/12 | (2006.01) |
| C02F 101/30 | (2006.01) |

(Continued)

(52) U.S. Cl.
CPC ............. *C02F 9/00* (2013.01); *B01D 61/58* (2013.01); *C02F 1/048* (2013.01); *C02F 1/283* (2013.01);
(Continued)

(58) Field of Classification Search
CPC ...... B01D 2311/08; C02F 1/048; C02F 1/444; C02F 3/12
See application file for complete search history.

(56) References Cited

U.S. PATENT DOCUMENTS

| 6,146,532 A | 11/2000 | Troesch | |
| 2004/0256322 A1* | 12/2004 | Frank ................. | B01D 61/16 |
| | | | 210/651 |

(Continued)

FOREIGN PATENT DOCUMENTS

| EP | 2732707 A1 * | 5/2014 | ............ A23C 21/00 |
| FR | 2984874 A1 | 6/2013 | |
| JP | 2002273462 A | 9/2002 | |

OTHER PUBLICATIONS

International Search Report for International Patent Application No. PCT/IB2019/053534, dated Jul. 24, 2019, 3 pages.

(Continued)

*Primary Examiner* — Bradley R Spies
(74) *Attorney, Agent, or Firm* — Armstrong Teasdale LLP

(57) ABSTRACT

A process for purifying washing waters of a production plant of the cosmetics sector includes subjecting the washing waters to an ultrafiltration treatment that produces an ultrafiltration concentrate and ultrafiltration water, and subjecting ultrafiltration water to a biological treatment with separation of sludges to be disposed of or further treated and treated water to be disposed of or to undergo subsequent treatments.

10 Claims, 1 Drawing Sheet

(51) Int. Cl.
*C02F 103/32* (2006.01)
*C02F 103/34* (2006.01)

(52) U.S. Cl.
CPC .............. *C02F 1/441* (2013.01); *C02F 1/444* (2013.01); *C02F 1/50* (2013.01); *C02F 3/12* (2013.01); *B01D 2311/06* (2013.01); *B01D 2311/08* (2013.01); *B01D 2311/2626* (2013.01); *B01D 2311/2673* (2013.01); *B01D 2311/2688* (2013.01); *C02F 2101/12* (2013.01); *C02F 2101/30* (2013.01); *C02F 2103/32* (2013.01); *C02F 2103/343* (2013.01); *C02F 2303/185* (2013.01)

(56) References Cited

U.S. PATENT DOCUMENTS

| | | | | |
|---|---|---|---|---|
| 2008/0171125 A1* | 7/2008 | Akashe | .................. | A23J 3/346 426/490 |
| 2011/0049054 A1 | 3/2011 | Merryman | | |
| 2013/0032532 A1 | 2/2013 | Arai et al. | | |
| 2014/0076808 A1 | 3/2014 | Morrison et al. | | |
| 2017/0107132 A1 | 4/2017 | Kuo | | |
| 2017/0198324 A1* | 7/2017 | Cheng | .................. | A61K 31/721 |

OTHER PUBLICATIONS

Inès Friha et al, Treatment of cosmetic industry wastewater by submerged membrane bioreactor with consideration of microbial community dynamics, International Biodeterioration & Biodegradation, Mar. 1, 2014, pp. 125-133, vol. 88, Elsevier Ltd., Amsterdam, NL.

Italian Search Report for Italian Patent Application No. 2018000005080, dated Sep. 20, 2018, 2 pages.

International Preliminary Report on Patentability for International Patent Application No. PCT/IB2019/053534, dated May 12, 2020, 14 pages.

\* cited by examiner

PROCESS AND INSTALLATION FOR PURIFICATION OF WASHING WATERS OF CHEMICAL PLANTS

CROSS-REFERENCE TO RELATED APPLICATIONS

This application is a National Stage Application of International Patent Application No. PCT/IB2019/053534, having an International Filing Date of Apr. 30, 2019, which claims the benefit of priority to Italian Patent Application No. 102018000005080, filed May 4, 2018, the entire contents of which are hereby incorporated by reference herein.

FIELD OF THE INVENTION

The object of the present invention is a process and a system for the purification of waters, in particular for chemical plants, for example in the cosmetics, pharmaceutical and food sectors. In particular, the present invention is aimed at the purification of the washing waters of the production plant.

BACKGROUND OF THE INVENTION

With particular reference to the cosmetics sector, in recent years there has been a twofold trend: on the one hand, a growing demand for products and, on the other, a change in consumer awareness with respect to production methods.

As recent market research has shown, a significant proportion of consumers of cosmetics products tends to favor brands that are able to offer products associated with so-called "green" production methods, i.e. those that are particularly respectful of the environment, with particular attention to the consumption of raw materials and the use of renewable energy sources.

It has been found that the consumer, also as a result of frequent and incisive awareness campaigns, has acquired a particular awareness to the consumption of water underlying a particular production process.

In particular, in the cosmetics production sector, water consumption is assessed with reference to the quantity necessary to maintain efficient production facilities and not to the quantity of water that enters the formulation of the final product.

In this context, for processes in the cosmetics sector, the greatest consumption of water is represented by the washing of plant components, such as the washing of reactors, pipes, floors, etc.

The washing waters of a cosmetics plant typically have a high level of pollution when compared to other industrial sectors or non-industrial waste, due to the presence of organic pollutants, fats, surfactants, heavy metals, etc. For example, taking into account the level of pollution represented by the COD (Chemical Oxygen Demand) parameter, a plant in the cosmetics sector has washing waters with an average value between 4000 mg/l and 40,000 mg/l. A galvanic plant, usually considered very polluting in the common sense, actually has a COD in a ratio of 100:1.

By combining different purification technologies, it could now be possible to achieve a high quality of treated water, so as to be reused in the production process itself; however, these technologies would require a high use of energy, chemicals and man-hours, and would generate by-products in considerable quantities to be disposed of. Overall, it would therefore not be a sustainable and environmentally friendly process.

For example, considering only energy consumption, the traditional technologies have an estimated energy consumption between 80-110 kW for each cubic meter of water treated and require a high cost for the initial plant investment.

SUMMARY OF THE INVENTION

The object of the present invention is to carry out a purification process on the washing water of a production plant that satisfies the requirements of obtaining treated water of an acceptable quality level to be discharged (for example, into the sewage system) or reused in the production cycle itself, and is at the same time a sustainable and environmentally friendly process.

Such object is achieved by a purification process as described and claimed herein. Advantageous embodiments of the purification process are also described. A purification system of washing water of a production plant is also described.

BRIEF DESCRIPTION OF THE DRAWINGS

The features and advantages of the purification process and system according to the present invention will be apparent from the description given hereinafter, provided by way of non-limiting example, in combination with the accompanying FIGURES, wherein.

DESCRIPTION OF THE INVENTION

Figure 1:
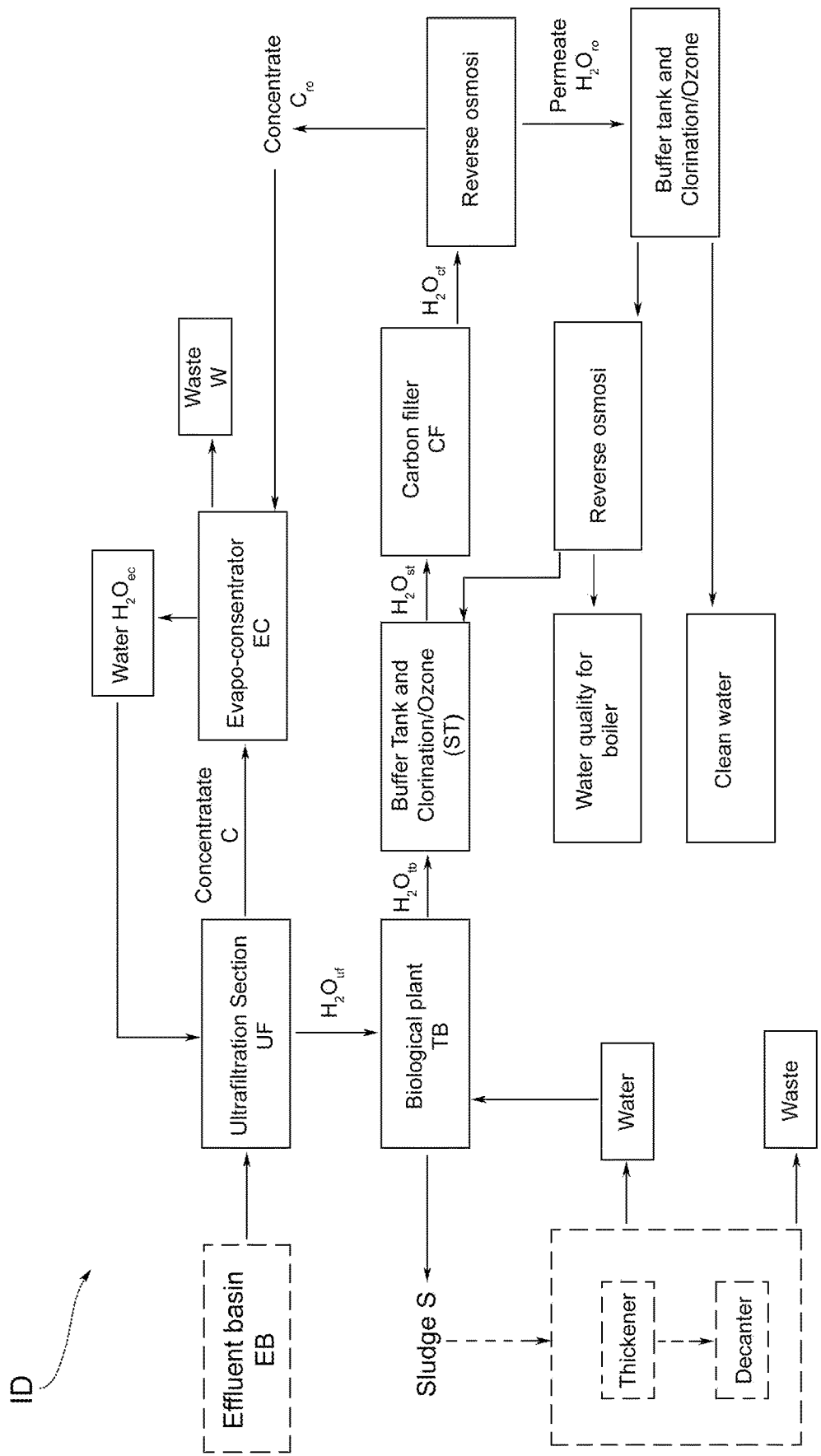
FIG. 1 represents a block diagram of the purification process and the system, according to an embodiment of the present invention.

According to an embodiment of the invention, a purification system ID is associated with a production plant (not shown), typically in the chemical sector, such as cosmetics, pharmaceuticals or food, and preferably comprises a containment basin EB, in which converge and are collected the waters deriving from washing the components of the production plant. If necessary, the washing waters are kept in movement in the containment basin EB by means of pumps or mixers.

The purification system ID comprises an ultrafiltration section UF which is operatively connected to the containment basin EB so that the entire volume of water to be treated is subjected to an ultrafiltration process. Said ultrafiltration section UF provides for the use tubular membranes and is configured to obtain a relatively small volume of ultrafiltration concentrate Cuf (for example, between 3-9% by weight of the volume of water treated by the ultrafiltration section UF) and a relatively large volume of ultrafiltration water H2Ouf.

According to an alternative embodiment of the purification process, the ultrafiltration concentrate Cuf leaving the ultrafiltration section UF is disposed of as special waste.

According to a further embodiment of the purification process, the ultrafiltration concentrate Cuf leaving the ultrafiltration section UF is further treated by evaporation.

For this purpose, the purification system ID comprises an evaporator-concentrator EC operatively connected to the ultrafiltration section UF in order to receive the incoming ultrafiltration concentrate Cuf and perform an evaporation-concentration after which one obtains a waste W to be disposed of as special waste and evaporation water H2Oec that is again fed into the ultrafiltration section UF.

For example, the evaporation treatment is of the vacuum type (single- or multiple-effect) or by thermocompression.

The purification system ID further comprises a biological treatment section TB, operatively connected to the ultrafiltration section UF so as to receive the incoming ultrafiltered water H2Ouf and subject it to a biological treatment with the obtainment of a sludge S to be disposed of and a treated water H2Otb.

For example, the biological treatment is of the type with activated sludges, with or without membrane and possibly with nitrification and denitrification.

For example, the biological treatment section TB comprises a tank for the collection of ultrafiltered water H2Ouf and the action of activated sludges, and a further membrane for the separation of the sludge S and treated water H2Otb.

Said biological treatment section TB is configured, in particular through an adequate sizing of the tank and retention times, in order to obtain a treated water H2Otb with a COD pollutant load lower than 100 mg/l, for example, about 70 mg/l. Note that the regulatory requirement for discharge into the public sewage system provides for a COD between 500 and 1000 mg/l, according to local regulations. Treated water H2Otb could thus be discharged into a sewage system or into a watercourse or to the ground.

The sludge S produced by the biological treatment section TB, preferably in quantities of about 15-20 kg/day of dry matter in the case of a flow rate of 1000 liters/hour with a COD of the water in the tank equal to 20,000 mg/l, is intended for direct disposal or further processing by inspissation and decantation. In the latter case, the water obtained is fed back into the biological treatment section TB.

The biological treatment that takes place in the biological treatment section TB does not provide for the introduction of biological nutrients into the tank, nor dilution water from sources outside the system.

Preferably, the treated water H2Obt leaving the biological treatment section TB is sent to a storage compartment ST, sized with the object of storing the treated water until it is reused.

The storage compartment ST is preferably kept aerated, and sanitizing agents are generally added to the stored water, for example chlorine and/or ozone, in order to avoid the onset of problems due to the bacterial load.

At the time of reuse, the stored water H2Ost is taken from the storage compartment ST and preferably subjected to an active carbon filtration in a filter CF, which aims to eliminate the presence of chlorinated products formed following the use of sanitizers, for example in the storage phase.

The filtered water H2Ocf in the filter CF is then preferably sent to a reverse osmosis compartment RO, which provides membranes suitable to reduce organic and saline pollutants.

The reverse osmosis treatment allows a concentrate Cro (generally equal to 10-20% by weight of the filtered water H2Ocf) to be obtained, which may be discharged or sent to the evaporator-concentrator EC.

The reverse osmosis treatment also makes it possible to obtain a permeated water H2Oro which, possibly after sanitizing agents such as chlorine and/or ozone have again been added thereto, may be reused in the production plant.

Alternatively, permeated water H2Oro may be discharged, for example, to a sewage system, a watercourse or to the ground.

According to a further embodiment, the permeated water H2Oro, possibly after sanitizing agents such as chlorine and/or ozone have again been added thereto, is subjected to a further reverse osmosis to obtain a water with characteristics so as to be reused in the boiler for the production of steam.

In the latter case, the concentrate obtained from the further reverse osmosis is sent to the storage compartment ST.

The purification process described above further provides for the monitoring of certain characteristic parameters.

For example, at the exit from the ultrafiltration section UF, turbidity, specific electrical conductivity, pH and temperature are monitored.

For example, in the biological treatment section TB, the pH and dissolved oxygen are monitored.

For example, in the reverse osmosis compartment, the specific electrical conductivity, the Redox and the TOC (Total Organic Carbon) value are monitored, preferably continuously.

Innovatively, the purification process described above makes it possible to satisfy the requirements of many industries in the chemical sector, as it is sustainable and environmentally friendly.

Moreover, the process is advantageously adaptable to different business needs, allowing the reuse of all the washing water or only a part thereof, greatly reducing the process costs.

For example, in the case of a 75% reuse of water, energy consumption is on the order of 15 kW per cubic meter of treated water, while traditional processes are on the order of 110 kW per cubic meter treated.

According to a further advantageous aspect, the water purified by the process according to the present invention may be discharged into a sewage system or into a watercourse or to the ground, since it also meets the most stringent requirements.

It is clear that one skilled in the art, in order to satisfy contingent requirements, may make changes to the process and the system described above, all contained within the scope of protection as defined by the following claims.

The invention claimed is:

1. A process for purifying washing waters of a production plant of the cosmetics sector, the process comprising:
    subjecting the washing waters to an ultrafiltration treatment in an ultrafiltration section, wherein the ultrafiltration treatment produces an ultrafiltration concentrate and ultrafiltration water; and
    subjecting the ultrafiltration water to a biological treatment with separation of sludges to be disposed of or further treated and treated water to be disposed of or to undergo subsequent treatments,
    wherein the ultrafiltration concentrate is subjected to an evaporation treatment that produces a waste to be disposed of and evaporation water that is again fed into the ultrafiltration section.

2. The process of claim 1, wherein the treated water is stored with addition of sanitizing agents to avoid problems due to bacterial load.

3. The process of claim 2, wherein stored water is subjected to filtration with activated carbon to reduce chlorinated pollutants.

4. The process of claim 3, wherein filtered water is subjected to a first reverse osmosis treatment to reduce organic and saline pollutants.

5. The process of claim 4, wherein the reverse osmosis concentrate obtained from the first reverse osmosis treatment undergoes the evaporation treatment.

6. The process of claim 4, wherein the first reverse osmosis treatment produces permeated water, which after further addition of sanitizers, is reused in the production plant or disposed of.

7. The process of claim 6, wherein permeated water is subjected to a second reverse osmosis treatment to obtain water having characteristics to be reused in a boiler for production of steam.

8. The method of claim 1, wherein the biological treatment does not provide for introduction of biological nutrients.

9. The process of claim 1, wherein the biological treatment does not provide for introduction of dilution water coming from sources outside a system.

10. A system for the purification of washing waters of a production plant, the system comprising:
   an ultrafiltration section to subject the washing waters to an ultrafiltration treatment which produces an ultrafiltration concentrate and ultrafiltration water;
   a biological treatment section, operatively connected downstream of the ultrafiltration section, to subject the ultrafiltration water to a biological treatment with separation of sludges for disposal or further treatment and treated water for disposal or subsequent treatments; and
   an evaporator-concentrator operatively connected to the ultrafiltration section to receive incoming ultrafiltration concentrate and perform an evaporation-concentration after which is obtained a waste to be disposed of as special waste and evaporation water that is again fed into the ultrafiltration section.

* * * * *